Feb. 5, 1952     C. T. RASMUSSEN ET AL     2,584,614
TOOL CLAMPING MEANS
Filed Feb. 2, 1949
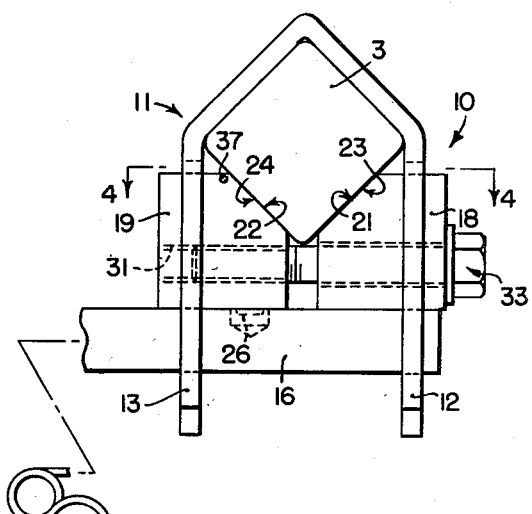
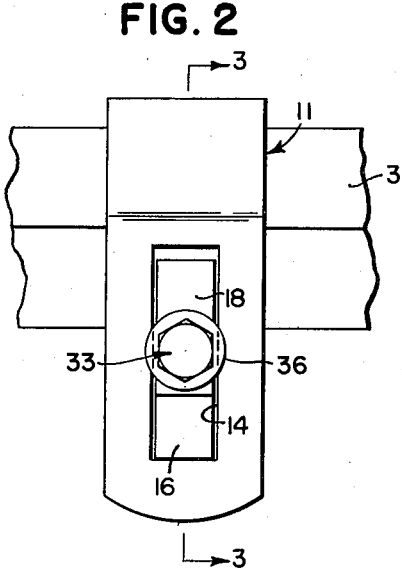
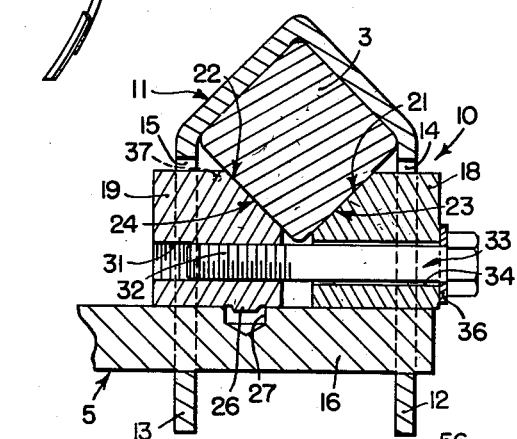
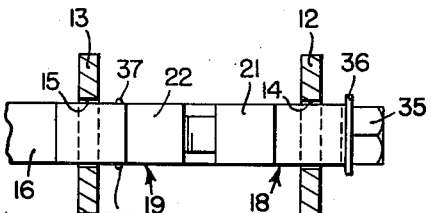
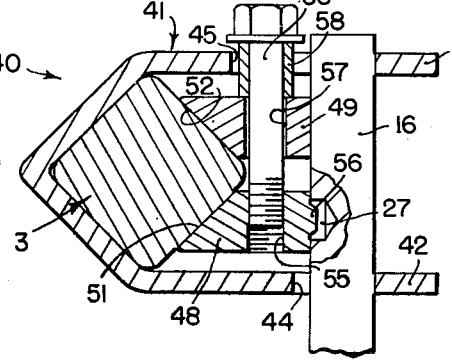
INVENTORS.
C. T. RASMUSSEN, W. R. FRANK
H. I. HAGEN
ATTORNEYS Patented Feb. 5, 1952

2,584,614

UNITED STATES PATENT OFFICE 2,584,614

TOOL CLAMPING MEANS

Clarence T. Rasmussen, Los Angeles, William R. Frank, Bell, and Hobart I. Hagen, Long Beach, Calif., assignors to John Deere Killefer Company, Los Angeles, Calif., a corporation of California Application February 2, 1949, Serial No. 74,084

13 Claims. (Cl. 287—54)

The present invention relates generally to agricultural implements and more particularly to implements of the tool type bar in which various kinds and/or types of tools or operating units are adapted to be fixed to the tool bar, preferably for lateral adjustment and for quick attachment and detachment.

The object and general nature of the present invention is the provision of a tool bar clamping unit particularly adapted for securing tools to a tool bar of polygonal cross section whereby a pair of outer surfaces of the polygonal tool bar may be used in conjunction with relatively simple clamping members for fixing all of the associated parts together. More specifically, it is an important feature of this invention to provide a wedge block connection for tools for securing them to a tool bar, preferably square in cross section, which embodies a coupling member and a pair of wedging members adapted to be clamped together and to act against the angled surfaces of the tool bar for fixing a tool to the coupling member and securely fixing the latter and the tool part to the tool bar.

These and other objects and advantages of the present invention will be apparent to those skilled in the art after a consideration of the following detailed description, taken in conjunction with the accompanying drawings in which a preferred form of the invention has been shown by way of illustration.

In the drawings:

Figure 1 is a fragmentary view of an agricultural implement in which a cultivator tool is secured to a supporting tool bar by means of a clamping unit in which the principles of the present invention have been incorporated.

Figure 2 is a front view of the clamp arrangement shown in Figure 1.

Figure 3 is a sectional view taken generally along the line 3—3 of Figure 2.

Figure 4 is a view taken along the line 4—4 of Figure 1.

Figure 5 is a view similar to Figure 3, showing a modified construction.

Figure 6 is a view similar to Figure 3 showing the manner in which the clamping unit may be removed from the supporting tool bar without entirely disassembling the parts.

Referring now to the drawings, particularly Figure 1, the present invention is shown as incorporated in a draft device for connecting an implement to a support which includes a transverse tool bar 3 which may be connected to a propelling tractor or other means. Preferably, the tool bar 3 is square in cross section but may be of other polygonal configuration if desired. The tool bar 3 carried by the support is adapted to receive one or more implement tools, such as a cultivator tool 5, and the present invention is particularly concerned with the provision of new and improved clamping means for fixing the tool 5 to the tool bar 3.

The clamping means, indicated in its entirety by the reference numeral 10, of the present invention includes a generally U-shaped coupling member 11 having end portions 12 and 13 which are provided with elongated slots 14 and 15 to receive the rearward shank portion 16 of the tool part 5. When arranged as shown in Figure 1, the tool 5 is disposed transversely with respect to the tool bar 3.

A pair of clamping wedge members 18 and 19, preferably in the form of wedges, are disposed within the coupling U-shaped member 11, which may be formed of strap iron or the like, the ends of the clamping wedge members extending outwardly a short distance through the slots 14 and 15, as best shown in Figure 3. The clamping members 18 and 19 have angled wedging surfaces 21 and 22 adapted to bear against similarly angled surfaces 23 and 24 on the tool bar 3. Opposite with respect to the angled wedging surfaces 21 and 22, the wedge members 18 and 19 bear against the shank 16 of the tool 5 when the latter is disposed in the slots 14 and 15. One of the wedge members 18 and 19 is provided with a projecting lug 26 which enters into a notch or recess 27 formed in the shank 16.

One of the wedge members, preferably the wedge member 19, is formed with a screw-threaded opening 31 in which a threaded end 32 of a clamping bolt member 33 is disposed. The opposite portion of the bolt 33 passes through a plain opening 34 formed in the other wedge member 18, and disposed between the latter and the head 35 of the bolt 33 is a thrust washer 36. A pair of projections 37 are formed on the clamping wedge 19, and these projections, acting in conjunction with the washer 36, as best shown in Figures 4 and 6, prevent the wedge members 18 and 19 from becoming disconnected from the upper member 11, so long as the wedge members are connected by the bolt 33. That is, the lugs or projections 37 prevent the wedge members from passing outwardly through the slot 14 in the coupling member 11, when the assembly is removed from the square bar, and the washer 36 prevents the wedge members from dropping through the aforesaid slot in the other direction.

When the parts are assembled as shown in Figure 1, the tool part 5 is securely clamped to the tool bar 3 by tightening the bolt 33. Tightening the latter acts against the wedge member 18 and through the screw-threaded portion 32 against the wedge member 19 to draw the wedges toward one another along the angled clamping surfaces 23 and 24 of the square bar 3. This forces the lower or outer portions of the wedge members 18 and 19 outwardly against the shank 16 or the tool 5, thus securely holding the latter in the openings 14 and 15 in the U-shaped coupling member 11 which surrounds and embraces the square bar 3. Thus, the wedge members 18 and 19 act against the tool bar 3 and the tool shank 16 for securely clamping the coupling member 11 and the tool part 5 to the tool bar 3. In order to prevent slippage of the tool relative to the clamping member, the lug 26 seats in the recess 27, whereby there is no likelihood of the tool bar being pulled out of position, as under overload. When it is desired to adjust or remove the tool bar, the bolt 33 is loosened, which releases the clamping action and permits the clamping unit 10 to be slipped laterally along the square bar 3 to different positions, or if it is desired to entirely remove the tool 5, possibly for the substitution of other tools therefor, the bolt 33 is unscrewed sufficiently to permit the lug 26 to be disengaged from the recess 27, whereupon the tool 5 may be taken out of the coupling member 11. If it should be desired to entirely remove the unit 10, the bolt 33 is further unscrewed until the tool standard 16 can be removed. The two wedge blocks interconnected by the bolt 32 may then be shifted to the right (Figure 3) through the slot 14 until the projections 37 engage the end 12, and then swung upwardly and outwardly, after which the entire clamp unit 10 may be swung through about 45° relative to the tool bar 3 (Figure 6) and removed from the bar 3 without separating any of the parts of the clamp unit.

A modified form of construction is shown in Figure 5. Referring now to Figure 5, the present invention is shown as incorporated in a clamping unit which is indicated in its entirety in Figure 5 by the reference numeral 40 and includes a generally U-shaped coupling member 41 having end portions 42 and 43 which are slotted, as at 44 and 45, to receive the forward shank portion 16 of the tool part 5. The slot 45 is longer than the slot 44. When arranged as shown in Figure 5, the tool shank 16 is disposed vertically but it may be arranged horizontally, as in Figures 1-4, or the tool clamp unit shown in the latter figures may be placed on the tool bar 3 to accommodate a vertical tool, if desired. A pair of clamping wedge members 48 and 49 are disposed within the coupling U-shaped member 41 and the clamping members 48 and 49 have angled wedging surfaces 51 and 52 adapted to bear against the angled surfaces 23 and 24 on the tool bar 3. Like the wedge members 18 and 19, the wedge members 48 and 49 bear against the shank 16 of the tool 5 when the latter is disposed in the openings 44 and 45. One of the wedge members 48 and 49 is provided with a projecting lug 56 which enters into the notch or recess 27 formed in the shank 16.

The wedge member 48 is formed with a screw-threaded opening 55 in which the threaded end of a clamping bolt member 56 is disposed. The bolt 56 may be the same as or similar to the bolt 33 described above. The opposite portion of the bolt 56 passes through a plain opening 57 formed in the other wedge member 49, and disposed between the latter and the head of the bolt 56 is a bushing 58. The head portion of the bolt and the bushing 58 are disposed in and extend through the upper portion of the longer slot 45 in the end portion 43 of the U-shaped coupling member 41.

The action and operation of the clamping unit 40 shown in Figure 5 is substantially the same as the unit shown in Figures 1-4, and hence further explanation is deemed unnecessary.

While there has been shown above the preferred structure in which the principles of the present invention have been incorporated, it is to be understood that the present invention is not to be limited to the particular details shown and described above, but that, in fact, widely different means may be employed in the practice of the broader aspects of this invention.

What we claim, therefore, and desire to secure by Letters Patent is:

1. In a draft device for connecting an implement to a support, a tool bar member, a coupling member receiving and embracing said tool bar member, one of said members having a pair of oppositely angled surfaces, a pair of clamping members having complementarily formed angled surfaces, a tool part carried by said coupling member and receiving said clamping members, and means acting against said clamping members for moving them along said angled surfaces and bearing against said tool part for clamping said tool bar member in said coupling member and securing said tool part to said tool bar member.

2. In a draft device for connecting an implement to a support, a tool bar, a tool part adapted to be secured to said tool bar, the latter having a pair of angled surfaces, a coupling member receiving and embracing said tool bar and having openings to receive said tool part, a pair of clamping members having complementarily formed angled surfaces adapted to engage said pair of angled surfaces and opposite tool part engaging surfaces, and means acting against said clamping members for moving them along said angled surfaces and bearing against said tool part for clamping said tool part and said coupling member to said tool bar.

3. Means for clamping a tool part to a polygonal tool bar having angled surfaces, comprising a generally U-shaped coupling strap member adapted to embrace said tool bar and having apertured ends at opposite sides of said tool bar, said tool part being disposable in the apertures in the ends of said U-shaped member, a pair of clamping wedges, each bearing at one side against said tool part, said wedges bearing at their opposite sides against said angled tool bar surfaces, and tightening means for moving said clamping wedges along said angled tool bar surfaces to cause said wedges to clamp said tool part to the coupling member and the latter to said tool bar.

4. Means for clamping a tool part to a polygonal tool bar having outwardly converging angled surfaces, comprising a generally U-shaped coupling strap member adapted to embrace said tool bar and having apertured ends at opposite sides of said tool bar, said tool part being disposable in the apertures in the ends of said U-shaped member, a pair of clamping wedges, each bearing at one side against said tool part, said wedges bearing at their opposite sides against and movable toward and away from each other along said angled tool bar surfaces, and tightening means for moving said clamping wedges along said angled tool bar surfaces toward one another to cause said wedges to clamp said tool part to the coupling member and the latter to said tool bar.

5. The invention set forth in claim 3, further characterized by said wedges each having an opening therein and one of said openings being screw threaded, and the end portions of said coupling member being slotted to receive the outer ends of said clamping wedges.

6. The invention set forth in claim 3, further characterized by one of said wedges having an interlocked engagement with said tool part.

7. The invention set forth in claim 3, further characterized by one of said wedges having a lug, and an opening in said tool part to receive said lug whereby said latter wedge has an interlocked engagement with said tool part.

8. The invention set forth in claim 3, further characterized by said wedges having openings therein and one of said openings being screw threaded, the aperture in one of the ends of said coupling member being elongated, said tightening means comprising a bolt member having a threaded end received in said threaded opening and a head end portion extending through the opening in the other wedge and outwardly through said elongated opening, whereby said head portion is accessible for tightening or loosening exteriorly of said clamping wedges, and a bushing disposed about said head portion and lying between the head thereof and said other wedge, whereby tightening said bolt member serves to cause said wedges to clamp said tool part to the coupling member and the latter to said tool bar.

9. The invention set forth in claim 8, further characterized by said bushing also extending outwardly through said elongated opening.

10. The invention set forth in claim 3, further characterized by the aperture in one of said end portions of said coupling member being elongated to receive the outer end of the adjacent clamping wedge, said tightening means including a bolt having a head portion extending outwardly through said elongated aperture so as to be accessible exteriorly of said clamping means for tightening or loosening said clamping wedges.

11. Means for clamping a tool part to a polygonal tool bar having angled surfaces, comprising a generally U-shaped coupling strap member adapted to embrace said tool bar and having apertured ends at opposite sides of said tool bar, said tool part being disposable in the apertures in the ends of said U-shaped member, a pair of clamping wedges, each bearing at one side against said tool part, said wedges bearing at their opposite sides against said angled tool bar surfaces, tightening means for moving said clamping wedges along said angled tool bar surfaces to cause said wedges to clamp said tool part to the coupling member and the latter to said tool bar, and projecting means carried by the clamping wedges and cooperating with said strap member to prevent disengagement of said clamping wedges from said strap member when the clamping means is loosened or disconnected from said tool bar.

12. Means for clamping a tool part to a polygonal tool bar having angled surfaces, comprising a generally U-shaped coupling strap member adapted to embrace said tool bar and having end sections at opposite sides of said tool bar, said end sections being provided with elongated slots therein, said tool part being disposable in the outer portions of said elongated slots, a pair of clamping wedges, each bearing at one side against said tool part, said wedges bearing at their opposite sides against said angled tool bar surfaces and shaped to extend through said slots, tightening means for moving said clamping wedges along said angled tool bar surfaces to cause said wedges to clamp said tool part to the coupling member and the latter to said tool bar, and projecting means carried by the clamping wedges and cooperating with said strap member to prevent disengagement of said clamping wedges from said strap member when the clamping means is loosened or disconnected from said tool bar, said slots being of such length and said projecting means being constructed and arranged so that, when the tool part is removed from the coupling member, the clamping wedges and said tightening means may be shifted relative to said coupling member into a position to provide for removal of said coupling member, clamping wedges and tightening means as a unit from the tool bar.

13. Means for clamping a tool part to a polygonal tool bar having angled surfaces, comprising a coupling member adapted to embrace said tool bar and having apertured ends at opposite sides of said tool bar, said tool part being disposable in the apertures in the ends of said coupling member, a pair of clamping wedges, each bearing at one side against said tool part, said wedges bearing at their opposite sides against said angled tool bar surfaces, and means for moving said clamping wedges along said angled tool bar surfaces to cause said wedges to clamp said tool part to the coupling member and the latter to said tool bar.

CLARENCE T. RASMUSSEN.
WILLIAM R. FRANK.
HOBART I. HAGEN.

REFERENCES CITED

The following references are of record in the file of this patent:

UNITED STATES PATENTS

| Number | Name | Date |
| --- | --- | --- |
| 2,445,543 | Thines | July 20, 1948 |

FOREIGN PATENTS

| Number | Country | Date |
| --- | --- | --- |
| 248,952 | Great Britain | Mar. 18, 1926 |